(12) United States Patent
Kunstmann et al.

(10) Patent No.: US 7,469,661 B2
(45) Date of Patent: Dec. 30, 2008

(54) ADDITIVE TANK FOR A VEHICLE HAVING AN INTERNAL COMBUSTION ENGINE

(75) Inventors: Olivier Kunstmann, Argentre (FR); Eric Riviere, Saint Sulpice (FR)

(73) Assignee: Inergy Automotive Systems Research (Société Anonyme), Brussels (BE)

( * ) Notice: Subject to any disclaimer, the term of this patent is extended or adjusted under 35 U.S.C. 154(b) by 65 days.

(21) Appl. No.: 11/596,314

(22) PCT Filed: May 13, 2005

(86) PCT No.: PCT/EP2005/052221

§ 371 (c)(1), (2), (4) Date: Nov. 13, 2006

(87) PCT Pub. No.: WO2005/113279

PCT Pub. Date: Dec. 1, 2005

(65) Prior Publication Data

US 2008/0037908 A1    Feb. 14, 2008

(30) Foreign Application Priority Data

May 13, 2004    (FR) .................. 04 05233

(51) Int. Cl.
*F02M 25/00* (2006.01)
*F02B 47/00* (2006.01)

(52) U.S. Cl. .................. 123/1 A; 123/198 A

(58) Field of Classification Search .............. 123/1 A, 123/198 A, 585, 531; 383/3
See application file for complete search history.

(56) References Cited

U.S. PATENT DOCUMENTS

| | | | | |
|---|---|---|---|---|
| 2,736,307 A | * | 2/1956 | Wilcox ................ | 123/196 S |
| 2,930,337 A | * | 3/1960 | Perrier et al. ........... | 114/20.1 |
| 4,621,593 A | | 11/1986 | Rao et al. | |
| 5,526,795 A | * | 6/1996 | Thompson et al. ....... | 123/516 |
| 6,260,544 B1 | * | 7/2001 | Spry et al. ............. | 123/516 |
| 6,321,692 B1 | * | 11/2001 | Rayner ................ | 123/1 A |
| 6,453,885 B1 | * | 9/2002 | Short ................. | 123/518 |
| 7,229,067 B2 | * | 6/2007 | Dimarzo et al. ......... | 261/79.2 |
| 2002/0007804 A1 | * | 1/2002 | Tichenor et al. ........ | 123/1 A |

FOREIGN PATENT DOCUMENTS

| | | |
|---|---|---|
| DE | 40 28 253 | 7/1991 |
| DE | 101 12 361 | 10/2002 |
| FR | 2 805 002 A1 | 8/2001 |
| FR | 2 834 004 | 6/2003 |
| FR | 2 834 006 | 6/2003 |
| FR | 2 865 688 | 8/2005 |

OTHER PUBLICATIONS

U.S. Appl. No. 10/554,985, filed Apr. 29, 2004, Campenon et al.

(Continued)

*Primary Examiner*—Hai H Huynh
(74) *Attorney, Agent, or Firm*—Oblon, Spivak, McClelland, Maier & Neustadt, P.C.

(57) ABSTRACT

An additive tank for a vehicle having an internal combustion engine, the tank including a flexible bag which contains the additive and is connected to a device allowing the flexible bag to be pressurized in order to meter the additive.

13 Claims, 2 Drawing Sheets

OTHER PUBLICATIONS

Figure 1:
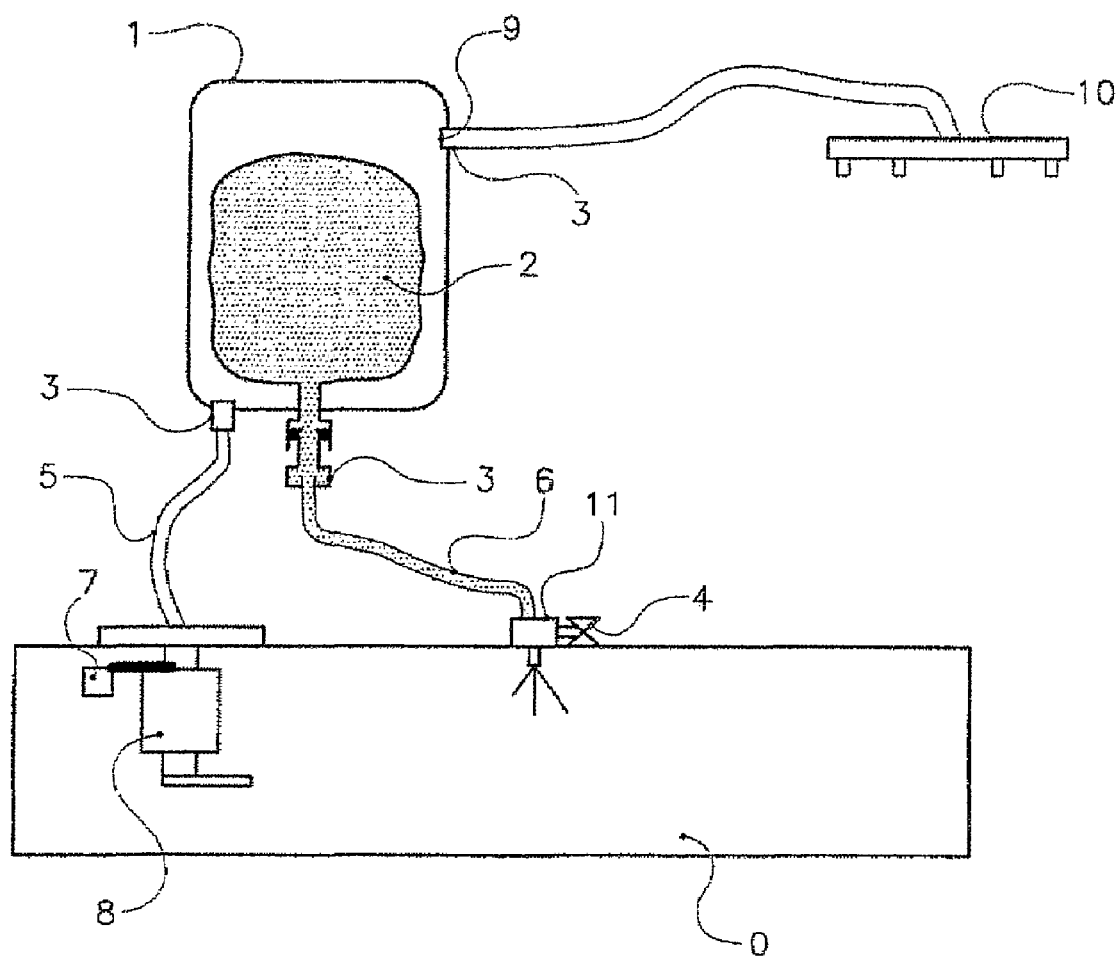

U.S. Appl. No. 10/578,302, filed May 4, 2006, Campenon et al.
U.S. Appl. No. 10/583,101, filed Jun. 16, 2006, Buffard et al.
U.S. Appl. No. 11/579,993, filed Nov. 9, 2006, Potier, et al.
U.S. Appl. No. 11/596,314, filed Nov. 13, 2006, Kunstmann, et al.
U.S. Appl. No. 11/596,314, filed Nov. 13, 2006, Kunstmann et al.
U.S. Appl. No. 11/576,013, filed Mar. 26, 2007, Compere et al.

* cited by examiner

ADDITIVE TANK FOR A VEHICLE HAVING AN INTERNAL COMBUSTION ENGINE

The invention relates to the field of vehicles having an internal combustion engine.

It relates more especially to an additive tank for such vehicles whether equipped with an engine supplied with volatile or heavy liquid fuels such as the fuels termed, depending on the country and region, diesel, derv or diesel oil.

The desire to improve the protection of the environment has lead the national and international authorities in numerous regions of the world to tighten the legislative standards in terms of the emission of pollutants in many fields, particularly in the field of automotive transport. Thus, the motor manufacturers have undertaken research with a view to reducing the emissions of particles (particularly in the case of diesel engines) and certain pollutant gases (NOx, CO, etc.). This research has, in particular, culminated in the addition of certain additives (such as certain metal salts, urea, ammonia, carbamates, etc.) to the fuel, to the engine, to the exhausts gases, etc.

In the case of vehicles propelled by a diesel engine, the motor manufacturers have found a solution to the problem of the emission of particulates by equipping these vehicles with particle filters arranged in the line down which the combustion gases are exhausted to the atmosphere. In order to regenerate the filtering capability of these particulates filters, it is necessary regularly to burn off the particles that are partially clogging the filters. In order to be able to automate the periodic cycle of regenerating the particulates filters, it has been necessary to find a means of lowering the temperature at which these particulates burn so that this temperature is compatible with the highest temperatures that can be obtained in the exhaust gases by suitably and temporarily regulating the combustion parameters of the engine itself. The use of a certain amount of chemical combustion additive has been recognized as being necessary in order that the combustion temperature of the solid particles can be lowered in the exhaust gases to a temperature level that is compatible with the combustion in the engine and the total elimination of the particles. Liquid-additive tanks, small in volume by comparison with the fuel tank, have been designed to be mounted on, in, or near the fuel tank of diesel-engined vehicles.

Thus, patent application FR 04.00856 in the name of the Applicant Company discloses an additive tank comprising a chamber formed in a concave depression in the wall of the vehicle fuel tank. Such an installation of the additive tank has the advantage of providing a fuel system that is compact but multifunctional, that can be fitted with equal ease in the manufacture of feed systems to be used with engines running on volatile light hydrocarbons and the manufacture of feed systems for engines running on heavy hydrocarbons and which allows an additive to be metered not only into the fuel tank itself but also into any other part of the fuel system, of the engine, of the exhaust system, etc. However, the amount of additive contained in the "auxiliary tank" does not allow additive to be added throughout the life of the vehicle, and this means that one (or more) refill(s) is/are needed, and this may present problems of ergonomics, cleanliness and reliability in terms of the amount introduced into the auxiliary tank.

Furthermore, the system detailed in that patent application uses a filling device comprising a filling pipe, a vent pipe, preferably equipped at its upper part with means for visually indicating a state of overflow to an operator, and a pressure and depression safety system. Such a system is relatively complicated and therefore expensive and involves a risk of overflow on filling. Finally, in such a system, the additive may be subject to degradation following its contact with the ambient air and, what is more, the amount metered out is subject to inaccuracies as a result of the variation in pressure within the medium containing the additive.

It is therefore an object of the present invention to provide an additive tank which is simple, easy to fill cleanly and without the additive coming into contact with the ambient air, and in which the additive is not subjected to variations in pressure (for example due to altitude, atmospheric pressure, etc.), thus improving the accuracy with which it is metered.

To this end, the present invention relates to an additive tank for a vehicle having an internal combustion engine, the said tank comprising a flexible bag which contains the additive and which is connected to a device allowing it to be pressurized in order to expell the additive.

The invention makes it possible for example to refill the additive "as standard", by disconnecting/reconnecting (an empty bag and a full bag respectively) using quick couplings, without leakage. Alternatively, the bag may be filled on the vehicle by means of a pump. In this case, an inlet with a non-return valve is sufficient for filling, no venting needs to be envisaged and there is therefore no risk of the product overflowing or spilling out during the operation.

The fact that metering is done under pressure (rather than under gravity as it is in some systems) has the advantage that the tank can be orientated at will. Furthermore, the fact of pressurizing the bag rather than simply allowing the additive to flow out under gravity allows the said bag to be emptied correctly and this, given the cost of the additive, offers a certain economic advantage.

In this text, the vehicle may be an automotive vehicle (a car, truck, motorcycle, riverboat, sea-going ship or aeroplane, for example) or a vehicle constrained to a runway (for example a railway locomotive). It is a vehicle equipped with an internal combustion engine, i.e. an engine using the combustion of a fuel as its source of power.

A fuel is intended to denote a hydrocarbon suitable for powering internal combustion engines. This is preferably a liquid hydrocarbon, i.e. a hydrocarbon which, under the normal conditions of use of the engine, is in the liquid state in the engine's fuel tank. This may be a light (volatile) or heavy hydrocarbon. The expression "volatile liquid hydrocarbon" denotes a liquid hydrocarbon (according to the aforesaid definition) which has a saturated vapour tension in excess of 1 bar at 293 K (20° C.). Volatile liquid hydrocarbons commonly used to feed combustion engines in motor vehicles are those sold commercially under the name "petrol" and intended for spark-ignition combustion engines. The expression "heavy liquid hydrocarbon" denotes a liquid hydrocarbon which has a saturated vapour tension below 1 bar at 293 K (20° C.). Heavy liquid hydrocarbons commonly used for powering combustion engines of motor vehicles are those sold commercially under the names diesel or diesel oil and intended for self-ignition combustion engines operating on the diesel cycle.

According to the invention, the additive tank comprises a flexible bag which contains the additive and is preferably sealed. The expression "flexible bag" is intended in fact to denote a deformable bag (elastic, flexible, handleable) that can easily be folded, flattened, crumpled, etc. This is a kind of flexible package from which the additive can easily be ejected (expelled) by altering its shape and its internal volume. The additive is "ejected" from this bag by pressurizing it using a suitable device. As a preference, the flexible bag is itself contained inside a rigid cartridge or casing (by contrast then: cannot be deformed without damage), the unit preferably being interchangeable and acting as an additive refill. This cartridge may be made of one piece with the fuel tank as described in the aforementioned application, the content of which is, for this purpose, introduced by reference into this application. Alternatively, it may be made of one piece with the tank filling pipe as described in application FR 03.05436, also in the name of the Applicant Company, and the content of which is, for this purpose, also introduced by reference into this application. However, advantageously, it is a separate component, specific and interchangeable and the shape and location of which will be chosen to make refilling with additive as ergonomic as possible.

According to an advantageous alternative form, the cartridge may include another function of the vehicle or of its fuel system. For example, it may include the fuel filter. As the additive is gradually consumed, the flexible bag as it contracts frees up area for filtration. This aspect makes it possible to solve the problem of the clogging of the filters.

The additive tank according to the invention may be made of any material compatible with the additives it is likely to contain. It may be a plastic or a metal. Plastics give good results in the context of the invention and thermoplastics are particularly good. A thermoplastic is intended to mean any thermoplastic polymer, including thermoplastic elastomers and blends thereof The term "polymer" denotes both homopolymers and copolymers (particularly binary or ternary copolymers). Examples of such copolymers are, non-limitingly: random copolymers, copolymers produced by sequential polymerization, block copolymers and graft copolymers. Any type of thermoplastic polymer or copolymer the melting point of which is below the decomposition temperature is suitable. Synthetic thermoplastics which have a melting range spread over at least 10° C. are particularly suitable. Examples of such materials include those which have polydispersion of their molecular mass.

In particular, use may be made of polyolefins, polyvinyl halides, thermoplastic polyesters, polyketones, polyamides and copolymers thereof A blend of polymers or copolymers may also be used, as may a blend of polymeric materials with inorganic, organic and/or natural fillers such as, by way of nonlimiting example: carbon, salts and other inorganic derivatives, natural fibres, glass fibres and polymer fibres. It is also possible to use multilayer structures consisting of stacked bonded layers comprising at least one of the polymers or copolymers described above. The flexible bag preferably has high resistance to bursting (pressure). It needs in particular to be able to withstand a service pressure ranging from 1 to 8 bar, or from 3 to 5 bar, and even be able to withstand spikes, measuring 10 bar or even 15 bar. It is, by definition, based on a flexible material such as low density polyethylene (LDPE) or an elastomer. As far as the rigid cartridge is concerned, when there is one, this is preferably based on high density polyethylene (HDPE). It may prove useful, depending on the nature of the additive in particular, for the flexible bag and/or the rigid cartridge to comprise an intermediate layer of barrier resin (such as EVOH (partially hydrolysed ethylene/vinyl acetate copolymer) for example).

The tank may be manufactured by any appropriate means. As a preference, the flexible bag is produced by extrusion-blow moulding, and the cartridge, if there is one, by extrusion blow-moulding or injection moulding and welding.

According to the invention, the flexible bag of the tank is connected to a device allowing it to be pressurized in order to meter the additive into the fuel, the exhaust gas or any other appropriate point depending on its nature.

According to a 1$^{st}$ alternative form, this device comprises a spring that is compressed at the time of filling with the additive. This spring needs to be sized in such a way as to obtain correct metering of the additive injection. This solution has the advantage of being very autonomous and economical.

According to another alternative form, the pressurizing device consists of a pump built into the vehicle and therein fulfilling some other function. This may, for example, be the main engine fuel feed pump. In this case, typically, pressures of the order of a few bar (3 to 5 bar for example) are used.

Whatever the alternative form chosen, the flexible bag is advantageously equipped with a metering system preferably comprising an electrically-operated valve connected to a computer.

The tank according to the invention is intended for any additive, preferably a pasty or liquid additive, which can be added either directly to the fuel as mentioned previously, or to the engine, the exhaust gases, etc. As a preference, the additive is intended for the fuel system of an engine and the present invention also aims to cover fuel systems equipped with an additive tank as described hereinabove.

When the function of the metering system is to dispense the additive into the fuel tank, it does so, for example, in a quantity which is a mathematical function (usually, although not necessarily, a proportional function) of the instantaneous engine fuel consumption. This quantity is generally calculated by an on-board computer or a special-purpose computer. Alternatively, metering may be done just once, just after filling, according to the amount of fuel introduced at the time of filling. In this case, the computer of whichever type is advantageously connected to a device detecting the opening and closing of the fuel filling system. Such a device may comprise an electromagnet connected with a moving part (the actual stopper or any other manual or automatic shut-off system) and which changes polarity between its open and its closed position. This difference in the state of the polarity is detected by the on-board computer which logs the content of the tank at the time that it is informed of this. If the position of the stopper when closed corresponds to a situation of rest for the computer, it is able to calculate a difference in volume of fuel introduced, between the moment the system is activated and the moment that it returns to a stable state. This volume serves as the basis for calculating the dosage performed after the stopper has been closed) needed to keep the additive concentration constant.

When the system is intended for a self-ignition engine running on diesel, the additive advantageously comprises a composition, in solution in a hydrocarbon-containing solvent, of a catalyst for the low-temperature combustion of carbonated solid particles produced by the incomplete combustion of the heavy hydrocarbon in a self-ignition engine. Examples of liquid additives that are suitable for this alternative form of the invention are salts of iron and of cerium in a hydrocarbon solution.

The constituent parts of such a fuel system are generally made of a plastic or metal able to withstand the fuels with or without alcohol and able to withstand the additive. Where possible, they are preferably made of plastic, especially given the advantage of lightness of weight and ease of use of this material.

Figure 2:
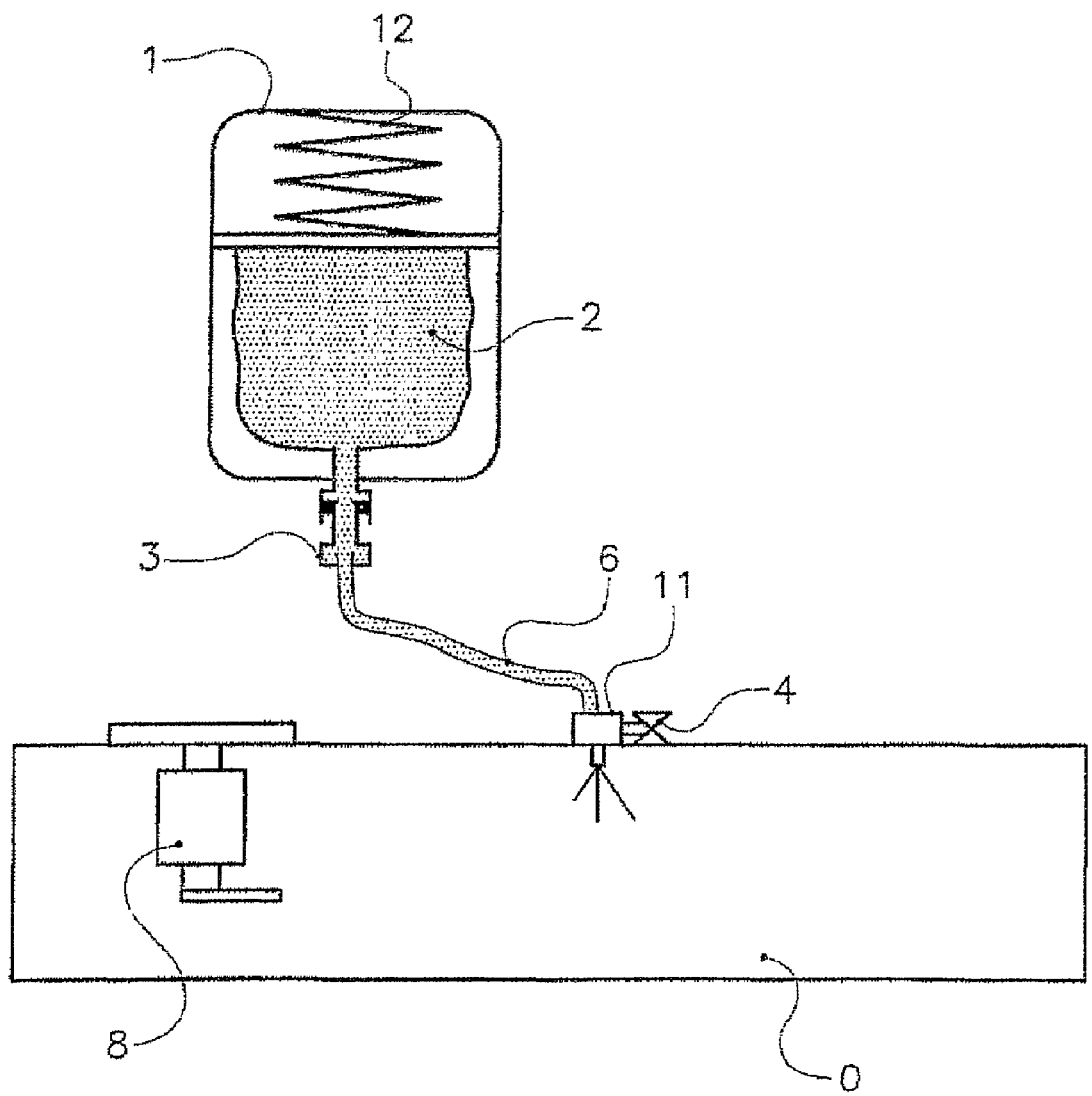

The present invention is illustrated nonlimitingly by FIGS. 1 and 2 each of which illustrates a preferred alternative form thereof In the alternative form of FIG. 1, the device for pressurizing the bag is the engine main fuel feed pump and in FIG. 2 it is a spring. In these figures, identical numbers denote identical elements.

FIG. 1 illustrates a fuel system comprising a main diesel tank (0) and an additive tank comprising a rigid cartridge (1) inside which there is a flexible bag (2) containing the additive.

The additive tank is connected to the fuel tank via sealed-connection quick couplings (3) and, respectively, a pipe for injecting the additive into the tank (6) which pipe is fitted with an electrically-operated valve (4) for metering the additive, and a pipe (5) for conveying the diesel to the cartridge (1) which incorporates the diesel filter. The additive tank is also connected via a 3$^{rd}$ quick coupling (3) to a pipe (9) for conveying the filtered diesel with additive added to the injection set that injects the fuel into the engine (10). The pressurizing of the bag (2) is performed by the pump (8)/pressure regulator (7) assembly. A computer (11) is connected to the electrically-operated valve (4) to manage the functions of filling and adding additive.

FIG. 2 also illustrates a fuel system comprising a main diesel tank (0) and an additive tank comprising a rigid cartridge (1) inside which there is a flexible bag (2) containing the additive. The additive tank is connected to the fuel tank via a sealed-connection quick coupling (3) and a pipe for injecting additive into the tank (6) which pipe is equipped with an electrically-operated valve (4) connected to a computer (11). The pressurizing of the bag (2) is performed by a spring (12). The pump/gauge module (8) this time is independent of the function of adding additive to the diesel.

The invention claimed is:

1. An additive tank for a vehicle having an internal combustion engine, comprising:
   a flexible bag that defines an outlet orifice in fluid communication with a pipe connected to a fuel tank of the vehicle;
   a liquid fuel additive; and
   a pressure device that applies pressure to an outside of the flexible bag so as to reduce the internal volume of said flexible bag and expel the liquid fuel additive out of the flexible bag, through the outlet orifice and into said fuel tank of the vehicle.

2. The additive tank according to claim 1, further comprising a rigid cartridge and wherein the flexible bag is contained inside the rigid cartridge.

3. The additive tank according claim 2, wherein the rigid cartridge includes a fuel filter.

4. The additive tank according to claim 2, wherein said pressure device includes a pump that pumps fluid into said rigid cartridge and outside said flexible bag so as to apply pressure to an outside of the flexible bag.

5. The additive tank according to claim 4, wherein said pump pumps fuel from said fuel tank into said rigid cartridge.

6. The additive tank according to claim 5, wherein said rigid cartridge filters said fuel pumped by said pump into said rigid cartridge.

7. The additive tank according to claim 1, wherein the pressure device includes a spring.

8. The additive tank according to claim 1, wherein the pressure device includes a pump built into the vehicle and which therein fulfils some other function.

9. The additive tank according to claim 8, wherein the pump is a main engine fuel feed pump.

10. The additive tank according to claim 1, wherein the flexible bag includes an electrically-operated valve connected to a computer so as to meter the liquid fuel additive correctly.

11. A fuel system comprising a fuel tank and equipped with an additive tank according to claim 1, wherein said additive tank is connected to said fuel tank via a pipe.

12. The fuel system according to the claim 11, wherein:
   the fuel is diesel and the engine is a self-ignition engine; and
   the liquid fuel additive comprises a composition, in solution in a hydrocarbon-containing solvent, of a catalyst for low-temperature combustion of carbonated solid particles produced by incomplete combustion of the diesel in the engine.

13. The additive tank according to claim 1, wherein said liquid fuel additive, when mixed with fuel of said vehicle, lowers a combustion temperature of solid particles in exhaust gases for said vehicle.

* * * * *